United States Patent [19]
Anson et al.

[11] Patent Number: 5,251,541
[45] Date of Patent: Oct. 12, 1993

[54] HOME BREWER

[75] Inventors: James H. Anson; William E. Midden, both of Springfield, Ill.

[73] Assignee: Bunn-O-Matic Corporation, Springfield, Ill.

[21] Appl. No.: 786,306

[22] Filed: Nov. 1, 1991

[51] Int. Cl.$^5$ .............................................. A47J 31/00
[52] U.S. Cl. ...................................... 99/280; 99/295; 99/299; 99/305; 99/307
[58] Field of Search ................ 99/279, 280, 281, 282, 99/283, 295, 299, 300, 304, 305, 306, 307; 426/433; 219/441

[56] References Cited

U.S. PATENT DOCUMENTS

| | | | |
|---|---|---|---|
| 4,676,148 | 6/1987 | Foley | 99/279 |
| 4,893,552 | 1/1990 | Wunder | 99/295 |
| 4,978,833 | 12/1990 | Knepler | 392/449 |

*Primary Examiner*—Robert W. Jenkins
*Attorney, Agent, or Firm*—Trexler, Bushnell, Giangiorgi & Blackstone, Ltd.

[57] ABSTRACT

A beverage brewing apparatus which employs a water control assembly, a moisture recovery assembly, an improved thermostatic and low water sensor configuration and an easily removable sprayhead. The control assembly controllably regulates the flow of water from the fill basin into the reservoir using a valve which is interconnected with a lid covering a fill opening in the hood portion. Water from the basin will not flow into the reservoir, and thus will not produce a brewed beverage, until the lid is closed by the user. The moisture recovery assembly employs a baffle opening and a collection portion on a vent to return condensation which may accumulate on the vent to the fill basin. A sleeve is positioned in the fill water opening in the hood portion to collect condensation and to reduce the surface area of the water which may be affected by air movements through the brewing apparatus. The thermostatic and low water sensing configurations position the temperature sensors outside of the water heating reservoir to prevent the accumulation of mineral and other deposits thereon. A portion of the wall behind which the sensors are positioned is thinned in order to more accurately read the corresponding temperatures.

16 Claims, 9 Drawing Sheets

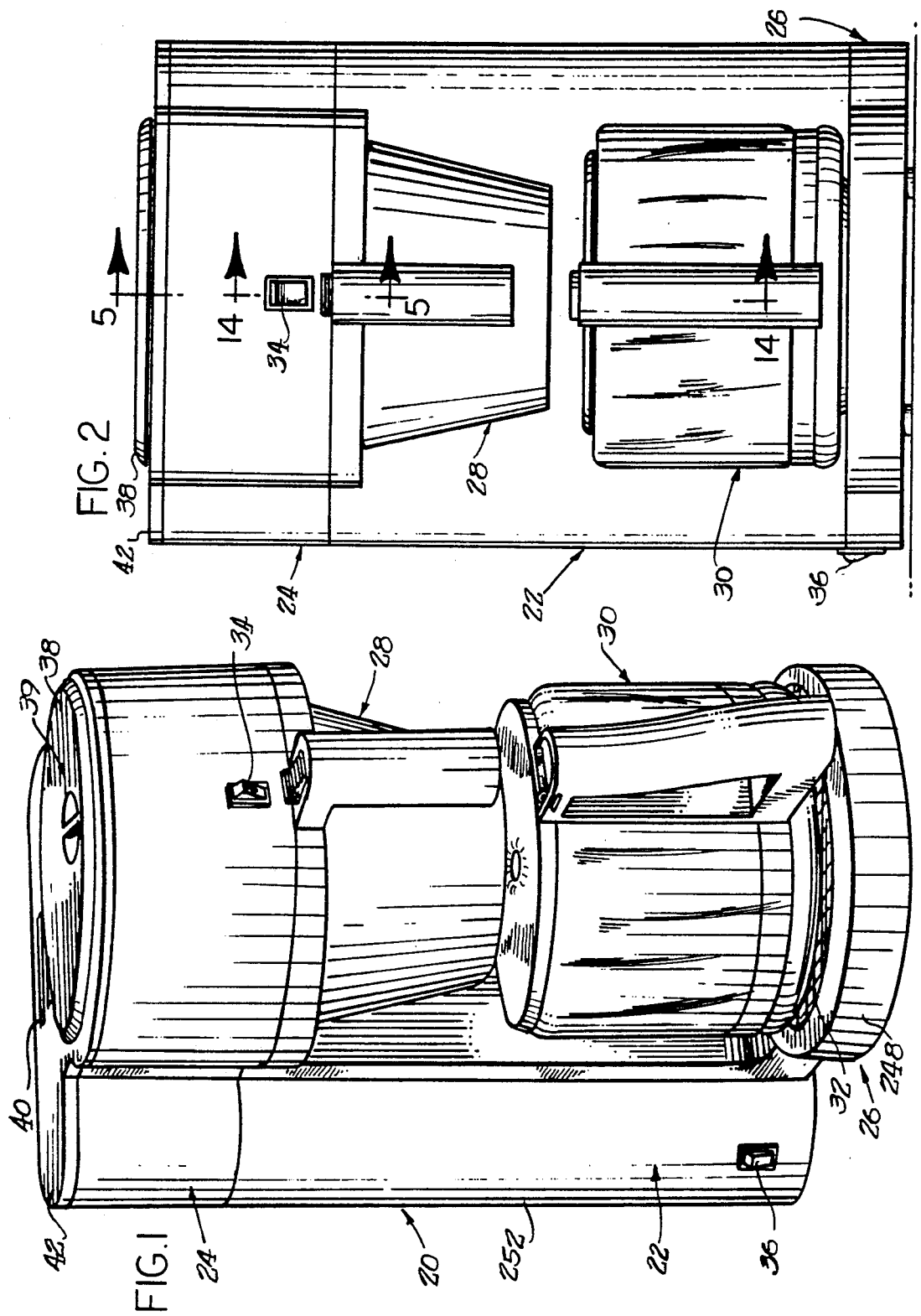

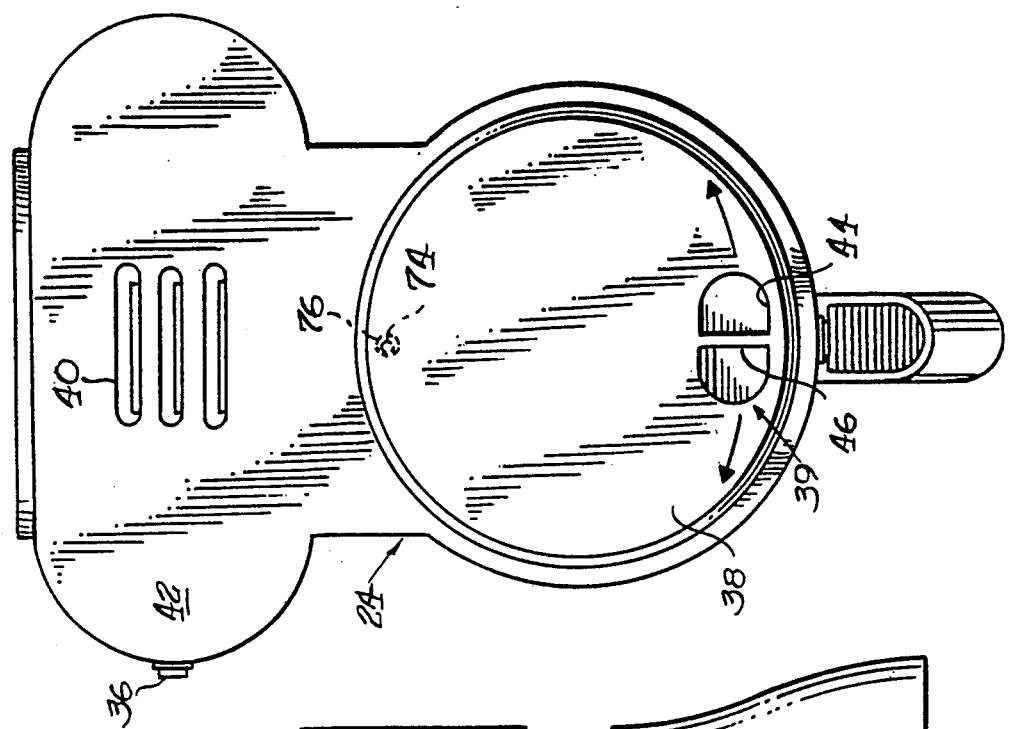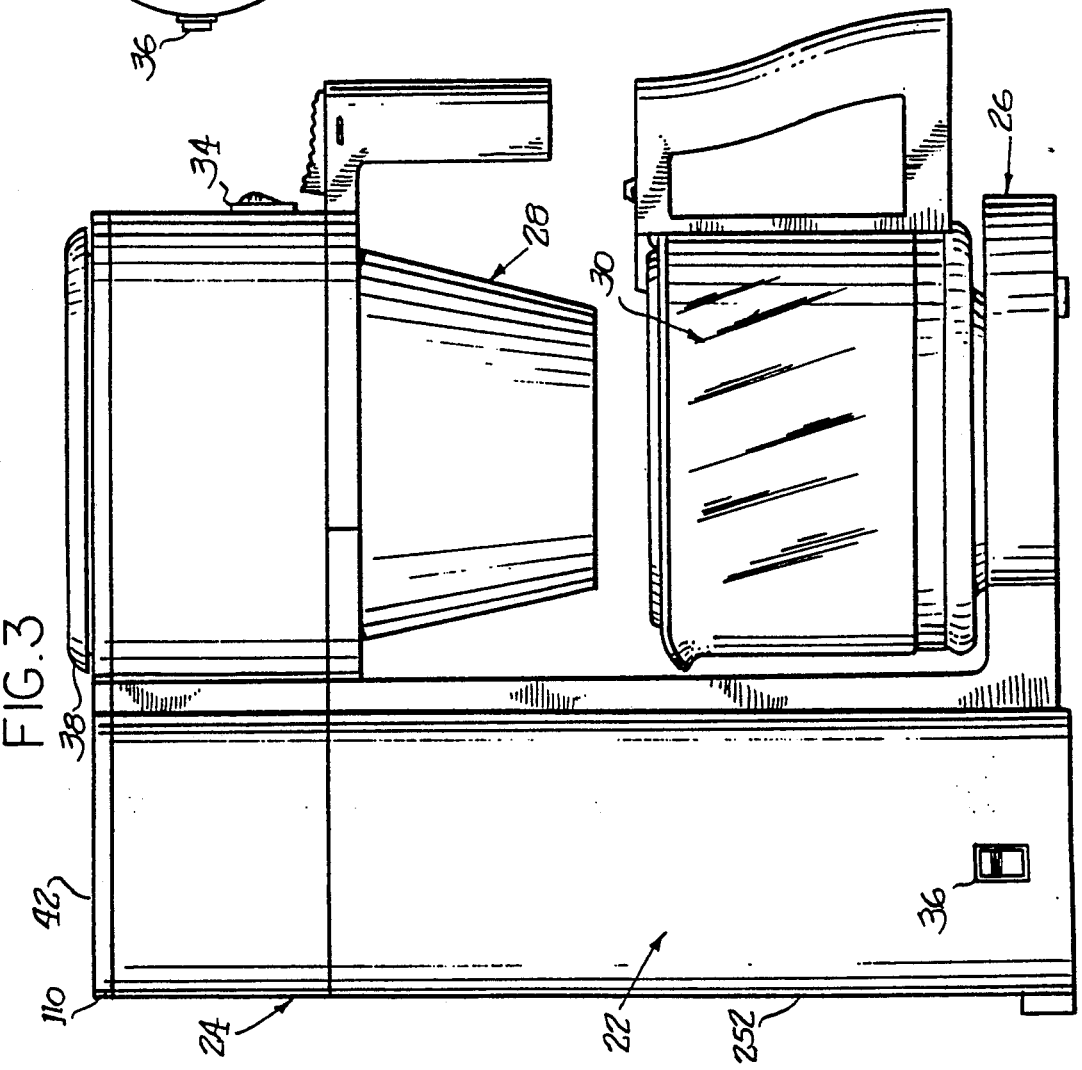

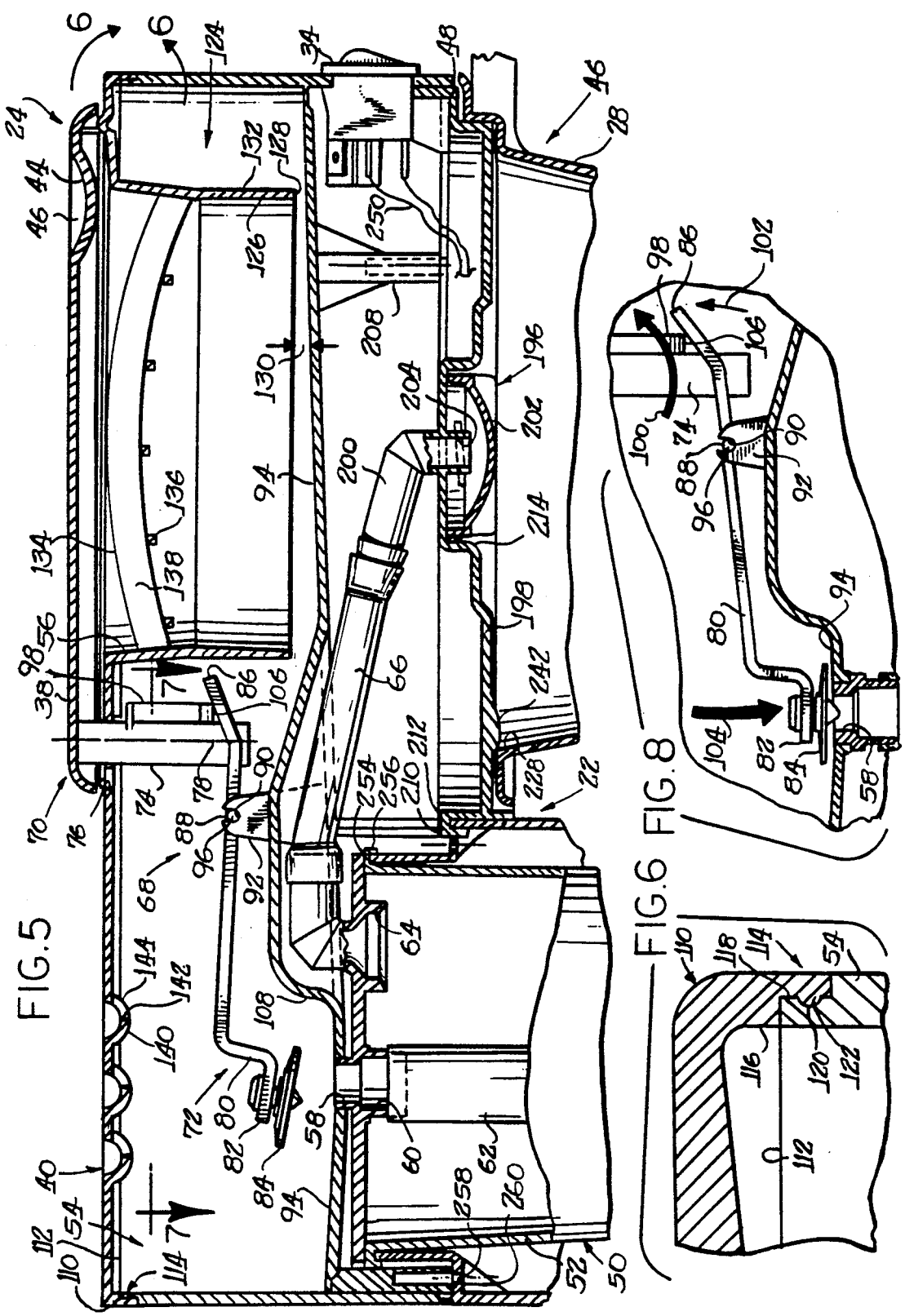

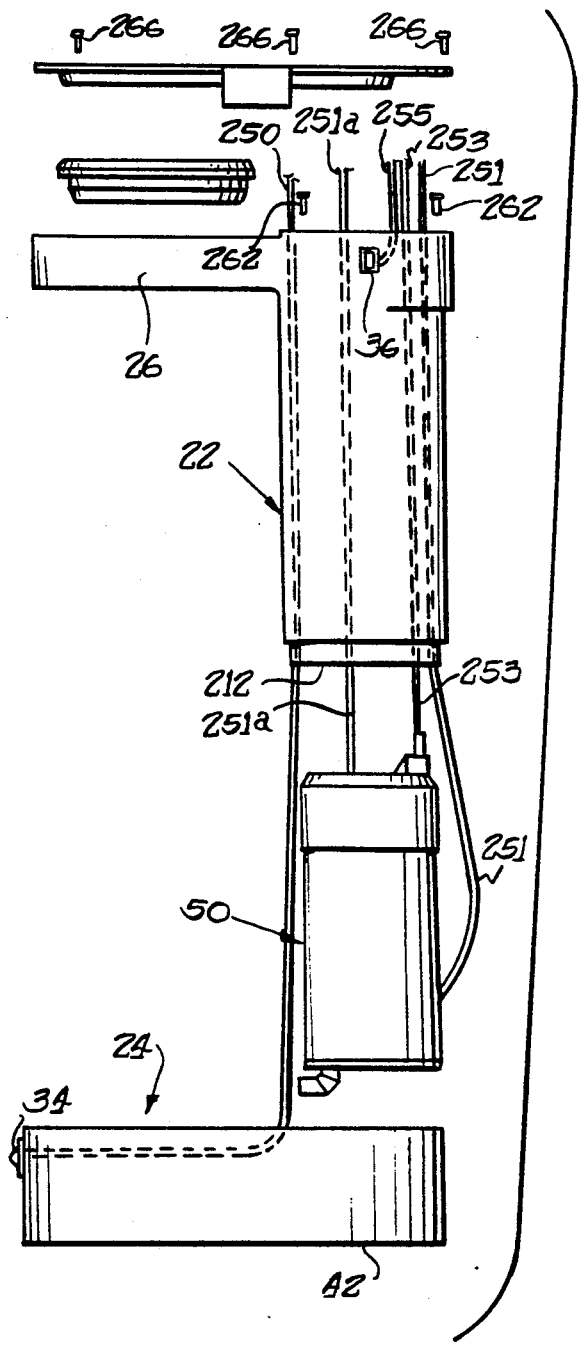
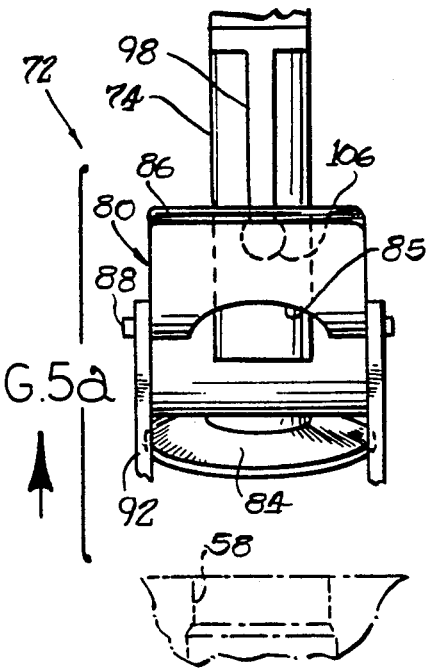
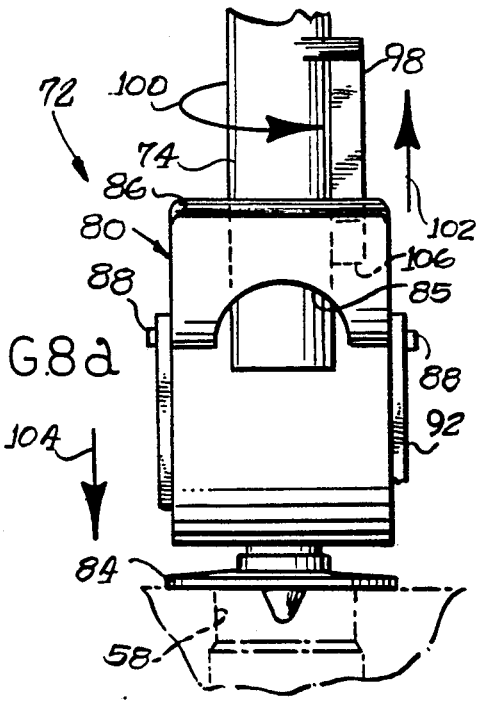

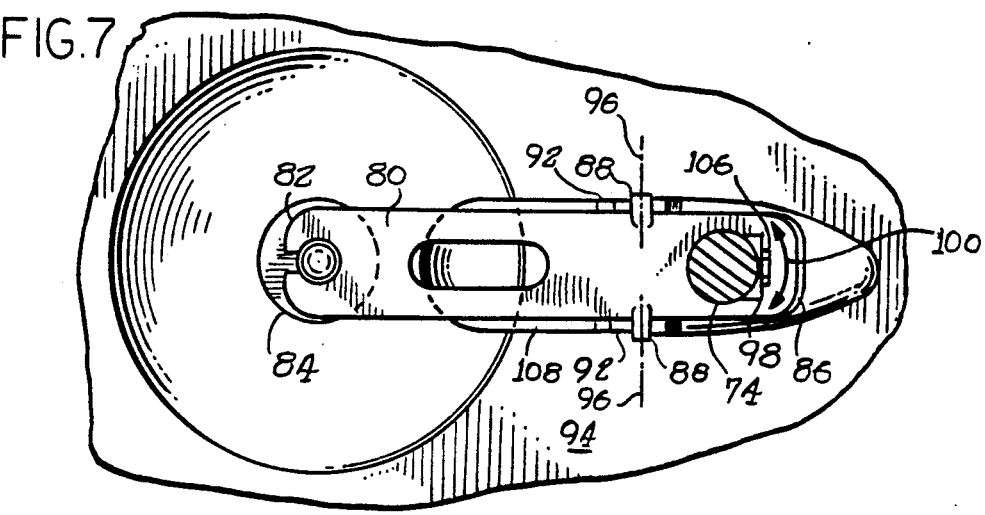
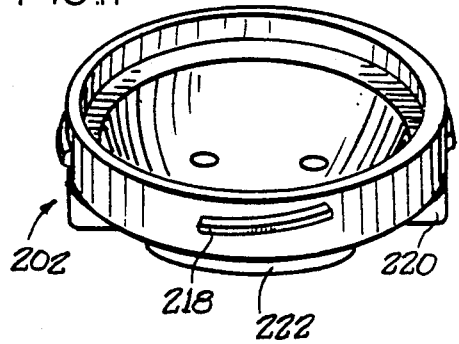
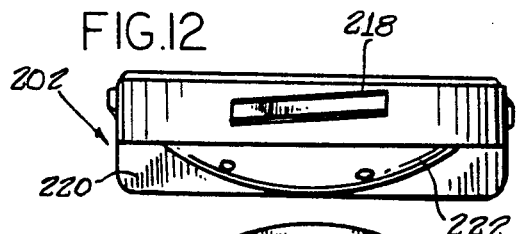
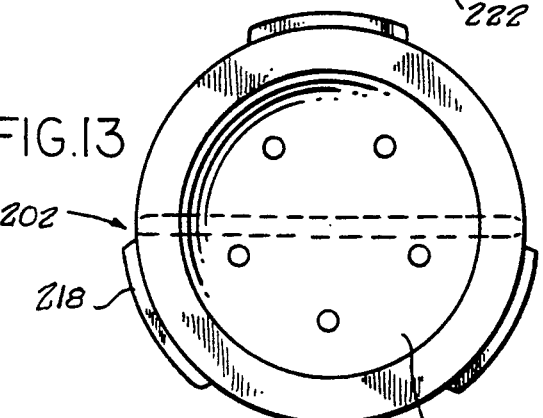
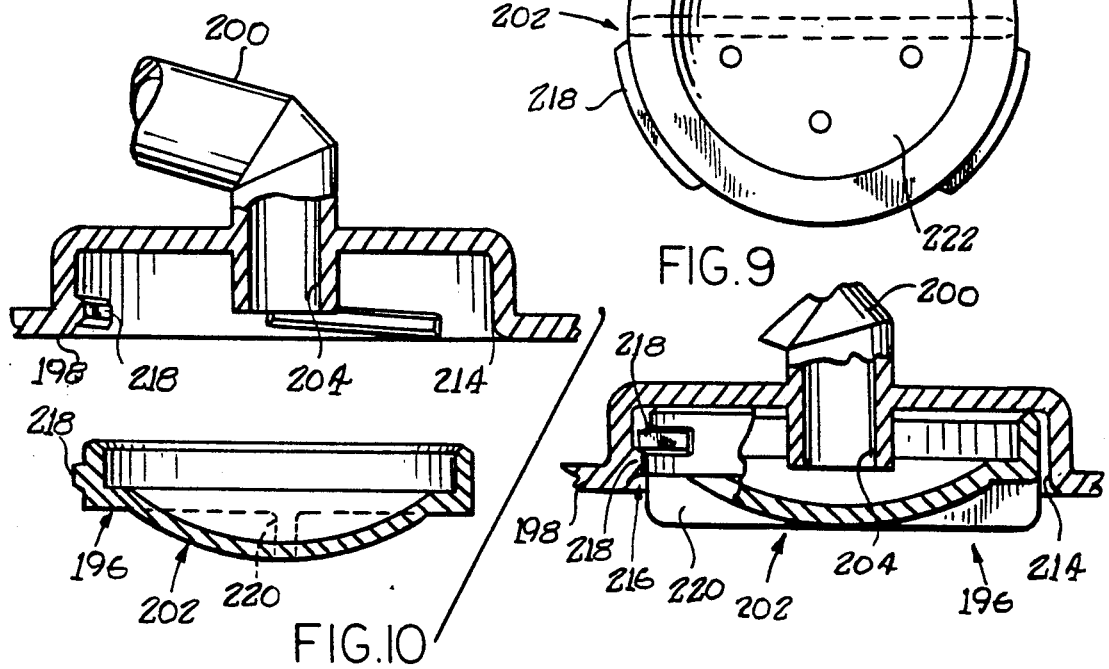

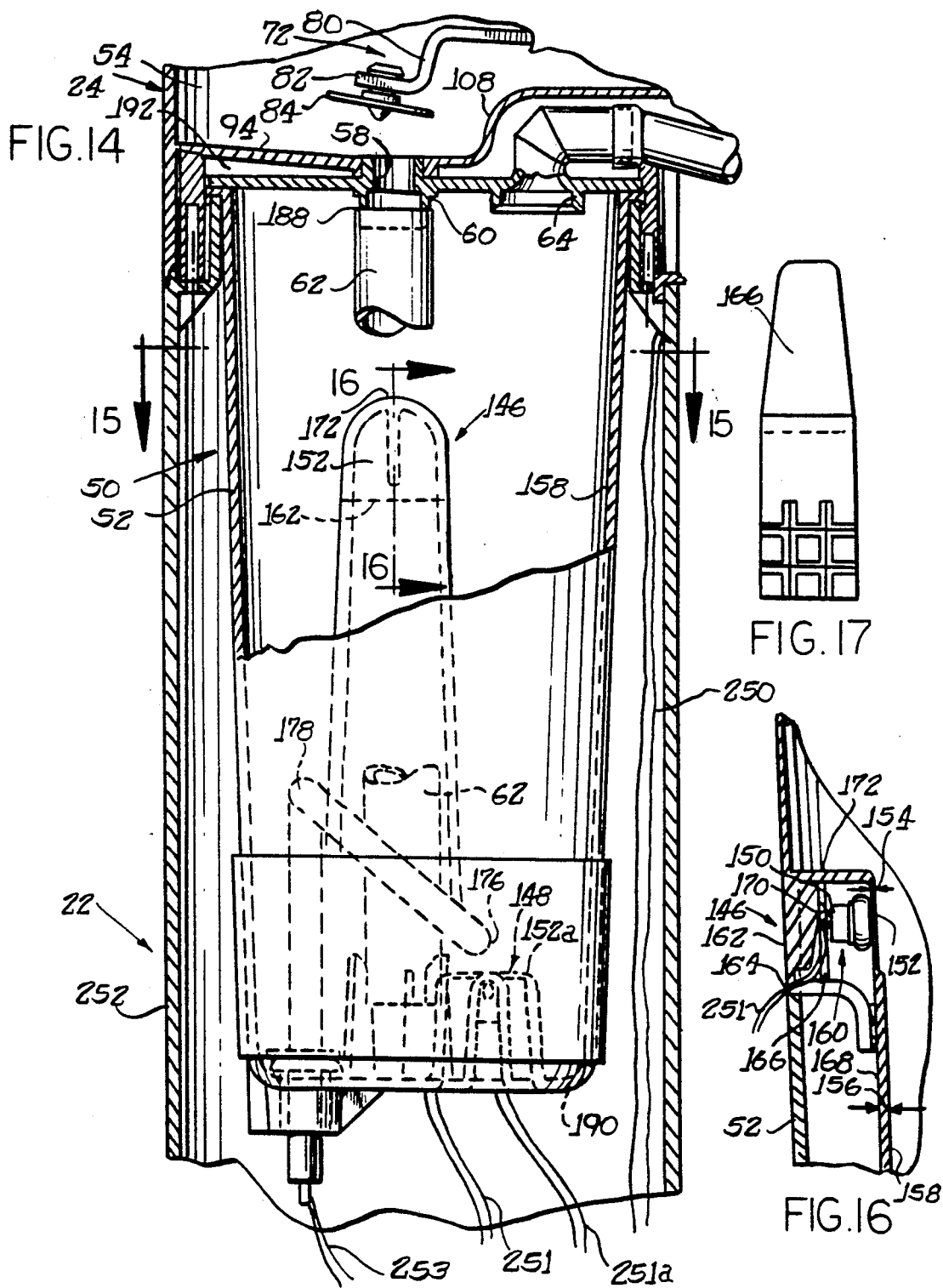

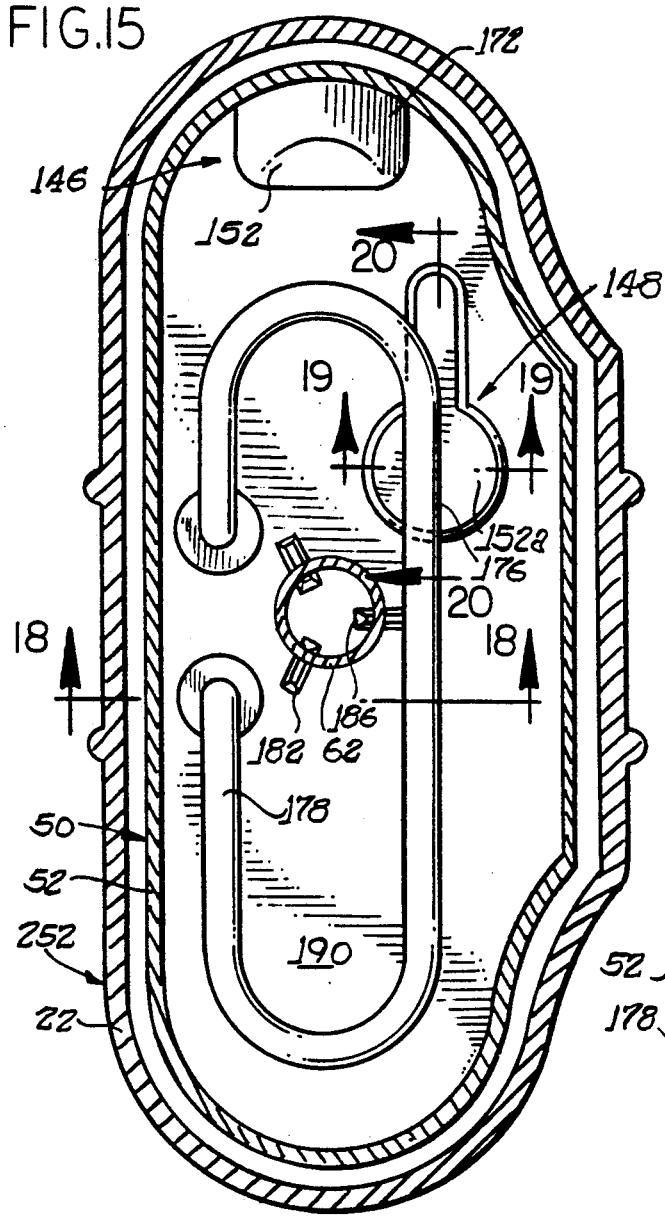
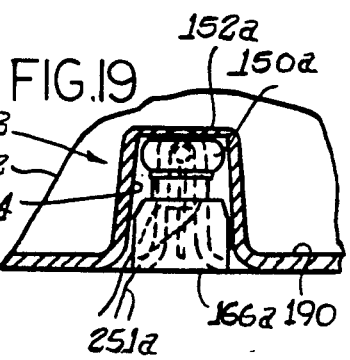
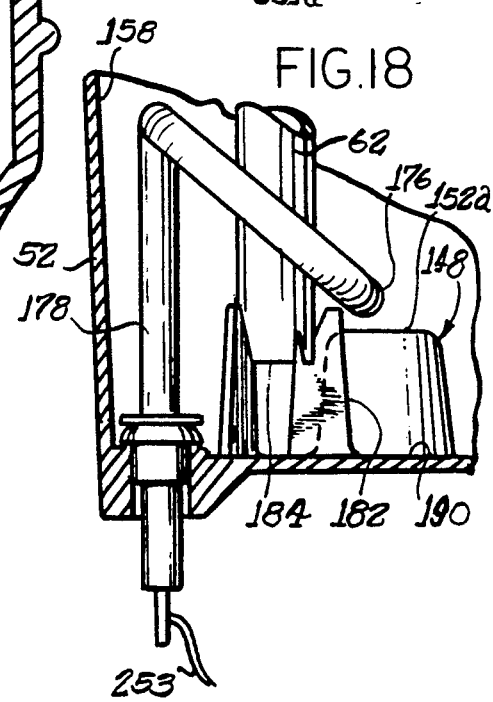
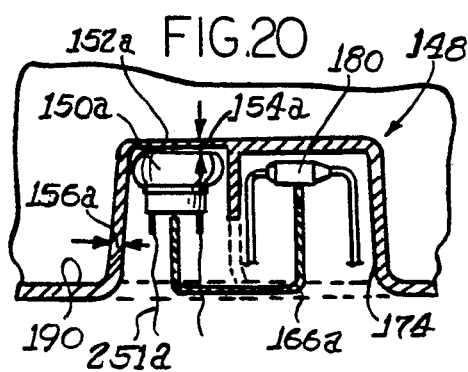

HOME BREWER

BACKGROUND OF THE INVENTION

The present invention is generally directed to a beverage brewing apparatus and the operational components which comprise the beverage brewing apparatus.

Many types of beverage brewing apparatus have been developed in order to accommodate the requirements and uses of various beverage brewing applications. In particular, a class of beverage brewing apparatus evolved to accommodate general consumer applications, such as for home use. A home brewing apparatus typically has a smaller per use brewing capacity than most commercial apparatus. Various consumer requirements have raised problems requiring solutions.

Generally, there are two branches of the home brewing apparatus class: a flash heating apparatus, and a pour-over or displacement apparatus. Both types of consumer beverage brewing apparatus typically are arranged with a hood portion which supports a brewing basket thereunder with a carafe or decanter positioned below. The hood portion is attached in some manner to a body portion which houses a reservoir. In the flash heating apparatus, a rapid heating element is positioned in the reservoir to quickly heat water which is then transported to the basket to infuse the brewing substance retained therein to create the brewed beverage. In the displacement system, the reservoir is sized to retain a prespecified quantity of water in a heated state so that when water is poured into the brewing apparatus heated water is instantly displaced from the reservoir to infuse the beverage brewing substance.

Both types of apparatus require water to be poured into the apparatus to brew a beverage. A problem arises when the decanter is used to measure and pour the water into the apparatus. This problem is common in the flash heating type apparatus and even more prevalent in the displacement type apparatus. In the displacement type apparatus, once the water is poured into the apparatus, the water instantly displaces heated water which almost instantaneously creates a stream of brewed beverage from the brewing basket. If the user does not quickly place the decanter underneath the basket, the brewed beverage will spill onto the heating pad which typically has begun to heat. Spilling of the brewed beverage can result in staining the heating pad as well as possibly the heating pad and any electrical connections associated with the heating pad.

Solutions of the above filling problem presented to date have not appeared to solve the problem. One easy solution provided the user with a decanter and a separate measuring container at the time the beverage brewing apparatus was purchased. This solution is both cumbersome and wasteful in that it requires a user to use two containers and requires the manufacturer to produce and package an additional container which would not be necessary if the filling problem could be solved. Clearly, if the measuring container becomes damaged, the user may resort to using the decanter for measuring brewing water or may have to find another container for measuring and pouring brewing water.

Other solutions have attempted to create an interlock drain valve between the funnel drain and the decanter. In such an apparatus placement of the decanter below the funnel operates a release mechanism operating a drain valve in the funnel. A problem arises when the interlocking mechanism becomes damaged or is not properly used and brewing water fills the basket which may result in an overflow of the brewing water, the beverage brewing substance, and the brewed beverage; thus creating a burdensome mess. Clearly, it would be more desirable to control the flow of brewing water before it has flowed to the brewing basket.

Prior beverage brewing apparatus also have a problem with moisture loss. Moisture loss is common in both the flash heating as well as the displacement brewing apparatus. In the flash heating apparatus, brewing water can be lost when the apparatus is employed with a timer such that the brewing water is disposed into a fill basin prior to the desired brewing time. Depending on the conditions, a considerable amount of brewing water may be lost through evaporation prior to brewing the beverage. In the displacement apparatus, evaporative loss is accelerated to a degree because a quantity of heated water is retained in the reservoir in a heated state. Naturally occurring air movement through the brewing apparatus combined with the heating of the water may result in considerable loss of brewing water. A reduced quantity of brewing water results in undesirable and uncontrolled variations in the resultant brewed beverage.

Safety concerns are extremely important in any type of beverage brewing apparatus. As such, it is important to provide safety features to prevent overheating of water as well as to turn off the heating element when the water heating reservoir is emptied. Typically, thermostatic probes have been employed to sense the temperature of the water in the heating reservoir. For example, in the displacement apparatus, a thermostatic probe senses the water temperature and correspondingly turns the heating element on or off in order to maintain a predetermined temperature range. Similarly, thermostatic sensors are commonly placed in or near the bottom of the heating reservoir in order to sense rapid changes in reservoir temperature. A rapid change in temperature indicates that the reservoir has been emptied because there is little or no water in which to distribute the thermal energy from the heating element. When the sensor senses that the reservoir is empty, the heating element is turned off. Clearly, this low water type sensor is important in any type of beverage brewing apparatus.

In most beverage brewing apparatus, the hood portion extends over the decanter and the brewing basket is suspended beneath the hood portion and above the decanter. A discharge tube extends from the heating reservoir through the hood portion to dispense water into the brewing basket. A sprayhead is usually employed to distribute the heated water more evenly over the beverage brewing substance retained in the brewing basket. As the sprayhead is positioned over the beverage brewing basket, it is prone to accumulate materials such as oils, chaff, and fine particulate matter carried in the steam which rises off of the beverage brewing substance during the infusion process. Therefore, it is desirable to provide a sprayhead which is easily removable from the beverage brewing apparatus for cleaning and repair purposes.

In the manufacture of beverage brewing apparatus, it is desirable to produce a product which is pleasing to the eye in its final form as well as easy to assemble during the manufacturing process. Typically, a beverage brewing apparatus must be inverted and reverted during an assembly process. Therefore, it would be desirable to provide a beverage brewing apparatus which may be cumulatively assembled in one position throughout the entire assembly operation.

OBJECTS AND SUMMARY OF THE INVENTION

A broad general object of the present invention is to provide a beverage brewing apparatus which improves operating convenience, safety, the resulting brewed beverage, as well as the manufacturing assembly operation.

A more specific object of the present invention is to provide a beverage brewing apparatus which controls the flow of brewing water before it flows into the reservoir so that a decanter, from which the brewing water is poured, may be placed underneath the brewing basket before a beverage stream is emitted from the brewing basket.

Another object of the present invention is to provide a beverage brewing apparatus which employs a moisture recovery assembly to reduce evaporative water loss prior to brewing.

Yet another object of the present invention is to provide a beverage brewing apparatus which improves a thermostatic sensor configuration and a low water sensor configuration.

Still another object of the present invention is to provide a beverage brewing apparatus which includes a sprayhead which is easily removed and easily cleaned.

A further object of the present invention is to provide a beverage brewing apparatus which is more efficiently assembled during the manufacturing assembly process.

Briefly, and in accordance with the foregoing, the present invention comprises a beverage brewing apparatus which employs a water control assembly, a moisture recovery assembly, an improved thermostatic and low water sensor configuration and an easily removable sprayhead. The water control assembly controllably regulates the flow of water from the fill basin into the reservoir using a valve which is interconnected with a lid covering a fill opening in the hood portion. Water from the basin will not flow into the reservoir, and thus will not produce a brewed beverage, until the lid is closed by the user. The moisture recovery assembly employs a baffle opening and a collection portion on a vent to return condensation which may accumulate on the vent to the fill basin. A sleeve is positioned in the fill water opening in the hood portion to collect condensation and to reduce the surface area of the water which may be affected by air movements through the brewing apparatus. The thermostatic and low water sensing configurations position the temperature sensors outside of the water heating reservoir to prevent the accumulation of mineral and other deposits thereon. A portion of the wall behind which the sensors are positioned is thinned in order to provide more accurate temperature readings.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a perspective view of a beverage brewing apparatus of the present invention;

FIG. 2 is a front elevational view of the beverage brewing apparatus;

FIG. 3 is a side elevational view of the beverage brewing apparatus;

FIG. 4 is a top plan view of the beverage brewing apparatus;

FIG. 5 is an enlarged partial fragmentary cross-sectional view of the present invention taken through a hood portion along line 5—5 in FIG. 2;

FIG. 5a is a partial fragmentary rear elevational view of the valve assembly as illustrated in FIG. 5;

FIG. 6 is an enlarged detail of a snap-fit assembly as shown in FIG. 5;

FIG. 7 is a top plan view of a valve of a lid assembly taken along line 7—7 in FIG. 5;

FIG. 8 is a partial fragmentary cross-sectional view of the valve assembly in a closed position;

FIG. 8a is a partial fragmentary rear elevational view of the valve assembly as illustrated in FIG. 8;

FIG. 9 is an enlarged partial fragmentary cross-sectional view of a spray assembly as illustrated in FIG. 5;

FIG. 10 is the spray assembly as illustrated in FIG. 9 in which a sprayhead member has been disengaged from the sprayhead assembly;

FIG. 11 is a perspective view of the sprayhead member;

FIG. 12 is a side elevational view of the sprayhead member;

FIG. 13 is a bottom plan view of the sprayhead member;

FIG. 14 is an enlarged partial fragmentary cross-sectional view of a reservoir assembly of the present invention taken along line 14—14 in FIG. 2;

FIG. 15 is a cross-sectional view of the reservoir assembly taken along line 15—15 in FIG. 14;

FIG. 16 is an enlarged partial fragmentary cross-sectional view of a thermostat configuration employed in the reservoir assembly of the present invention taken along line 16—16 in FIG. 14;

FIG. 17 is an enlarged side elevational view of a retaining cover used in the thermostat configuration;

FIG. 18 is a partial fragmentary cross-sectional view of a bottom portion of the reservoir assembly taken along line 18—18 in FIG. 15;

FIG. 19 is a partial fragmentary cross-sectional view of a low water sensing configuration taken along line 19—19 in FIG. 15;

FIG. 20 is a partial fragmentary cross-sectional view of the low water sensing configuration taken along line 20—20 in FIG. 15;

FIG. 26 is an exploded side elevational view of the assembly of sub-assemblies of the present invention.

DETAILED DESCRIPTION OF THE PREFERRED

Figure 21:
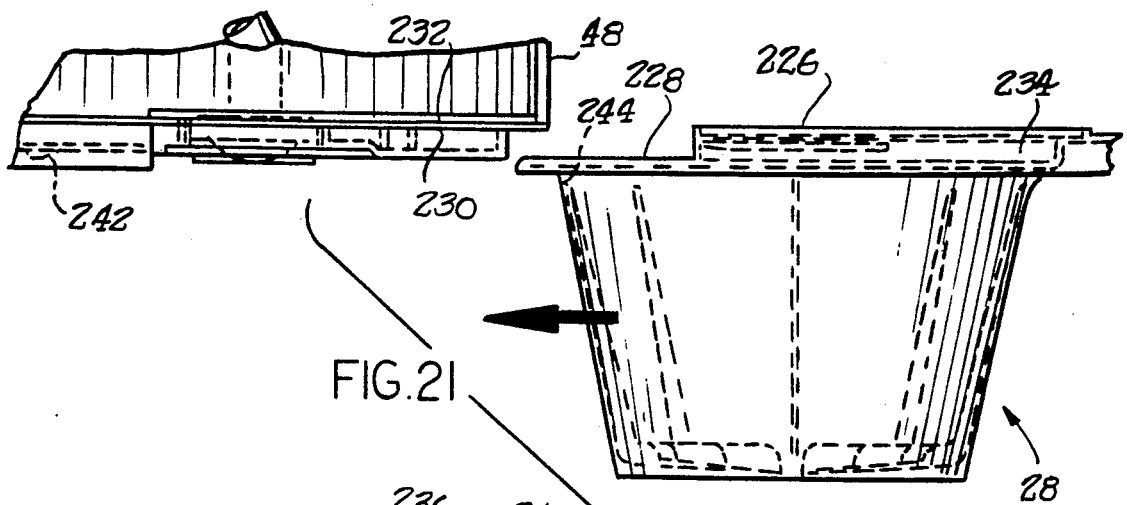
FIG. 21 is a partial fragmentary side view of the brewing assembly of the present invention showing engagement mounting means for retaining a brewing basket on a suspension portion of the brewing apparatus.
Figure 24:
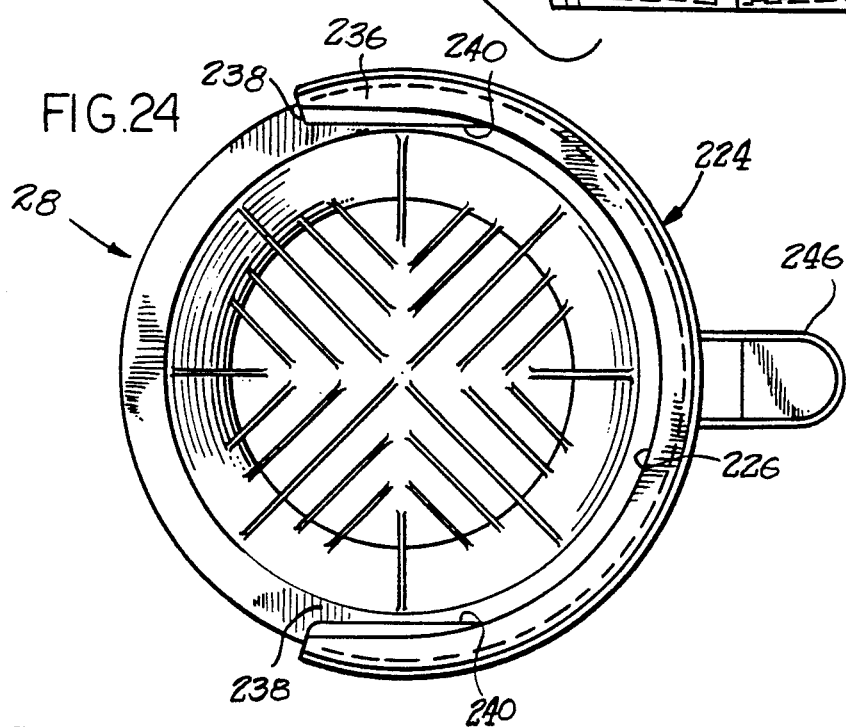
FIG. 24 is a top plan view of the beverage brewing basket as illustrated in FIG. 21.
Figure 25:
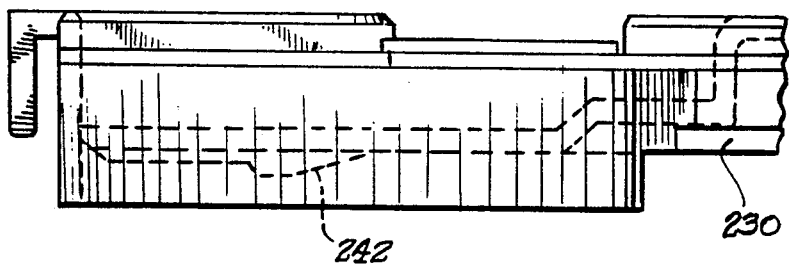
FIG. 25 is an enlarged partial fragmentary side elevational view of a rear portion of the suspension portion of the beverage brewing apparatus.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring now to the drawings, wherein like parts are designated by the same reference numerals throughout the figures, a beverage brewing apparatus or brewer 20 is shown in FIG. 1. The beverage brewing apparatus 20 includes a body structure 22, a hood assembly 24 attached to the top of the body structure 22, a base assembly 26 extending from the body structure 22 beneath the hood assembly 24, a brewing basket 28 suspended beneath the hood assembly 24, and a carafe 30 positioned beneath the basket 28 on the base assembly 26. The base assembly includes a warmer plate 32 which maintains the temperature of the brewed beverage retained in the carafe 30 (see also, FIG. 26). A first switch 34 is mounted on the hood assembly 24 and controls the warmer plate 32. A second switch 36, which controls the power to the brewer 20, is mounted in the lower section of the body structure 22. A lid 38 and multiple vents 40 are positioned on a top surface 42 of the hood assembly 24. The construction and operation of the lid 38 and vents 40 will be discussed in greater detail hereinbelow.

FIGS. 2, 3 and 4 show additional views of the beverage brewing apparatus 20 from a front, side elevation, and top plan view, respectively. As shown in FIGS. 1 and 4, a set of depressions 44 project into the surface of the lid 38 and have a ridge 46 therebetween forming a finger grip for moving the lid 38.

FIG. 5 provides a partial fragmentary cross-sectional view taken along line 5—5 in FIG. 2. Generally, FIG. 5 shows a cross-section through the hood assembly 24 but also shows an upper portion of a brewing assembly 46 suspended from a suspension portion 48 of the hood assembly 24, and an upper portion of a reservoir assembly 50 retained inside of the body structure 22. While the lower portion of the reservoir assembly 50 is not shown, a reservoir or tank 52 of the reservoir assembly 50 extends downwardly to a closed bottom (as better shown in FIG. 14).

The hood assembly 24 includes a fill basin 54 into which brewing water is poured to displace heated water retained in the tank 52. Water is poured into the fill basin 54 through an opening 56 formed through the top surface 42 of the hood assembly 24. Water disposed into the fill basin 54 flows through a fill port 58 formed in a lowermost portion thereof. Water passes from the fill port 58 through the entry port 60 into a fill tube 62 which directs the flow downwardly towards the bottom of the tank 52. When fill water displaces the heated water retained in the tank 52, the heated water is forced upwardly through a drain port 64 formed near the top of the tank 52 and out through a discharge tube 66 to the brewing assembly 46.

A fill water control assembly 68 controls the flow of water through the brewer 20. The fill water control assembly 68 includes a lid assembly 70 and a valve 72. The lid assembly 70 includes the lid member 38 and a shaft 74 attached thereto and projecting downwardly into the hood assembly 24 through an assembly hole 76 centered on and formed through the top surface 42 of the hood assembly 24 behind the opening 56. As shown, the lid member 38 is sized and dimensioned for covering the opening 56 and is integrally formed with the shaft 74 as a single piece unitary body. The lid member 38 rotates about a shaft axis 78 extending through the shaft 74. When the lid member 38 is rotated about the shaft axis 78 the lid 38 is moved to the side of the opening 56 thereby uncovering the opening 56 to provide access to the fill basin 54.

The valve 72 of the fill water control assembly 68 includes an arm member 80 having a first end 82 with a stopper 84 attached thereto. The primary purpose of the valve 72 is to control the flow of water to the brewing assembly 46 before it is discharged to the basket 28. The stopper 84 is movably positioned over the fill port 58. The shaft 74 extends through a hole 85 in the second end 86 of the arm member 80 coupling the shaft 74 with the arm member 80 in a manner that translates rotational movement of the shaft 74 into rotational movement of the arm member 80. An axle 88 attached to the arm member 80 is positioned in a rocker slot 90 on a base structure 92. Support of the arm 80 by a base structure 92 permits rotation of the first and second ends 82, 86 of the arm 80 about a pivot axis 96 positioned intermediate the first end 82 and the second end 86 extending through the axle 88 when the shaft 74 is rotated. While FIG. 5 shows a base structure 92 mounted to a bottom 94 of the basin 54, the base structure 92 could also be mounted overhead while achieving the same function.

As shown in FIG. 5, the lid 38 is positioned to cover the opening 56. With additional reference to FIG. 5a, when the lid 38 covers the opening 56 a fin 98 extending generally perpendicularly away from the shaft 74 presses against the second end 86 of the arm 80 to lift the stopper 84 away from the fill port 58. With reference to FIGS. 8 and 8a, when the shaft 74 is rotated (as indicated by arrow 100) by moving the lid member 38 to either side of the opening, the angled second end 86 of the arm 80 rotates upwardly (as indicated by arrow 102) about the pivot axis 96 and correspondingly the first end 8 rotates (as indicated by arrow 104) downwardly about the pivot axis 96 causing the stopper 84 to plug the fill port 58.

In this position, since the lid member 38 has been moved away from covering the opening 56, water may be poured into the fill basin 54 through the opening 56 and will not drain into the tank 52 since the valve 72 has plugged the fill port 58. A bottom edge 106 of the fin 98 is rounded to facilitate rotation 102, 104 of the arm 80. Closing the lid member 38 over the opening 56 once again rotates the shaft 74 thereby imposing forces on the second end 86 which lift the stopper 84 away from the fill port 58 allowing water in the fill basin 54 to flow into the tank 52.

The fill basin 54 is formed with a bottom 94 which slopes downwardly from all edges towards the fill port 58. A raised portion 108 of the bottom 94 provides elevation for the base structure 92 of the valve 72. Water in the fill basin 54 flows around the raised portion 108 to the fill port 58.

FIG. 6 illustrates an enlarged partial fragmentary view of an upper portion of the hood assembly 24 as illustrated in FIG. 5. With reference to FIGS. 5 and 6, a cover 110 is attached to a top edge 112 of the fill basin 54. Engagement of the cover 110 with the top edge 112 is accomplished by a snap-fit means 114 formed on an inside surface 116 of the cover 110 and on a corresponding outside surface 118 of the fill basin 54. As shown, the snap-fit means 114 includes a male portion 120 formed on one of the surfaces and a female portion 122 formed on the other surface to provide a frictional engagement therebetween to prevent the cover 110 from being removed from the top edge 112 of the fill basin 54. Clearly, other snap-fit or press-fit means may be employed to attach the cover 110 to the fill basin 54, however, the cover 110 is attached without fasteners. Attachment by snap-fit means 114 greatly facilitates assembly of the brewer 20 as will be discussed in greater detail hereinbelow.

FIG. 5 illustrates a moisture recovery assembly 124 which collects and returns moisture which evaporates from the basin water to the fill basin 54. Included in the moisture recovery assembly 124 is a hollow sleeve 126 which is attached to the cover 110 and extends downwardly into the fill basin 54 towards the bottom 94. The opening 56 extends through the hollow sleeve 126. A lower end 128 of the sleeve 126 is spaced in close proximity to the bottom of the basin 94, separated only by a small gap 130.

Moisture which collects on the inside of the fill basin 54 can collect on an outside surface 132 of the sleeve 126 and drain back into the fill basin 54. Because the sleeve projects downwardly into the fill basin 54 very close to the bottom 94 leaving only the small gap 130 therebetween, only the surface area of the water inside of the sleeve 126 is potentially exposed to evaporative air currents through the opening 56. Additionally, moisture which does rise off of the water inside of the hollow sleeve 126 may collect on a grill structure 134 extending over the opening 56. The grill structure 134 has numerous cross members 136, 138 running generally perpendicularly to one another. The grill structure 134 has a generally partially spherical shape which aids in directing water which condenses thereupon back into the fill basin 54.

Another component of the moisture recovery assembly 124 are the vents 40 which project through the top surface 24 of the cover 110. As shown in the plan view of FIG. 4, the vents 40 have a generally elongated shape and are positioned in series generally parallel to one another on the top surface 42 of the cover 110. The vents 40 have an inwardly projecting collecting portion 140 and a baffle opening 142 formed through a side 144 thereof. Forming the baffle openings 142 through a side 144 helps reduce the flow of air therethrough yet permits displacement of air therethrough when water is poured into the fill basin 54 through the opening 56 in hollow sleeve 126. The downwardly extending collecting portion 140 provides a point at which condensation which collects thereon can drip downwardly into the fill basin 54. Between brew cycles, when the fill basin 54 is empty, some moisture may rise through the fill tube 62 from the tank 52 since the stopper 84 does not seal the fill port 8 between brew cycles. Moisture which rises from the fill tube 62 may either collect on the stopper 84 and drip back into the fill basin 54 or may collect on the collecting portion 140 and drip back into the fill basin 54.

Turning now to the reservoir assembly 50 as illustrated in FIGS. 14-20, a thermostat configuration 146 and a low water sensing configuration 148 are shown. As best shown in FIGS. 14-17, the thermostat configuration 146 is arranged with a thermostatic sensor 150 of known construction positioned outside of the tank 52 and sensing temperature through the side wall of the tank 52. The thermostatic sensor 150 is positioned behind a first portion 152 which has a thickness dimension which is substantially smaller than a thickness dimension 156 of the surrounding side wall 158. Positioned in close proximity to the first portion 152 (see FIG. 16) the thermostatic sensor 150 accurately reads the temperature of the water inside of the tank 52 through the first portion 152.

The thermostat configuration 146 also includes a thermostat niche 160 which projects into the side wall 158 of the tank 52. The thermostat niche 160 protects the thermostatic sensor 150 from unintended impacts and from air movements which may affect temperature readings. As shown in FIGS. 16, the niche 160 includes a skirted portion 162 which results in enclosing the thermostatic sensor 150 on all sides but the bottom 164. To cover the bottom portion, a retaining cover 166 is provided to fit into the thermostat niche 160 with a press fit between an outside surface 168 of the side wall 150 and an inside surface 170 of the skirt 162.

The sensor 150 is positioned to sense the water temperature through the first portion 152 which is vertically oriented and formed in the side wall 158. The vertical orientation of the thermostatic sensor prevents accumulation of sediment and mineral deposits thereupon which would otherwise occur if the sensor 150 was horizontally positioned. A sedimentation layer build-up on a horizontally oriented first portion 152 would interfere with accurate sensor readings. Accuracy of the sensor's readings is improved by the vertical orientation of the first portion 152 in the present invention. A top portion 172 of the niche 160 is curved to help further reduce any accumulation of sedimentation or deposits which might otherwise accumulate and extend over the first portion 52.

Similar to the thermostat configuration 146, the low water sensing configuration 148 is arranged with a thermostatic sensor 150a positioned behind a first portion 152a which has a reduced thickness dimension 154a compared to the wall dimension 156a of the surrounding side walls 158a. Common elements of the thermostat configuration 146 and the low water sensing configuration 148 are denoted with a common reference numeral, however, a suffix (for example "a") has been added to the common reference numeral to denote the low water sensing configuration 148 components.

A low water sensor niche 174 houses the thermostatic sensor 150a of the low water sensing configuration 148. In the low water sensing configuration 148 the first portion 152a is formed in a top surface of the sensor niche 174. While the first portion 152a in the low water sensing configuration 148 is prone to accumulate sedimentation and mineral deposits as discussed above, such accumulations have a minor effect in the low water sensing configuration 148 as compared to the thermostat configuration 146. For example, the thermostat configuration 146 is used to sense subtle differences in water temperature to maintain the water temperature within a predetermined desired range, for example 195° F.+/−10° F. On the other hand, the low water sensing configuration 148 is used to sense gross temperature changes inside of the tank 52.

To further facilitate accurate and quick response time in a low water condition, the first portion 152a is positioned beneath the lowermost portion 176 of a heating element 178. The close proximity of the lowermost portion 176 of the heating element 178 to the first portion 152a results in the thermostatic sensor 150a behind the first portion 152 quickly sensing a low water condition.

A retaining cover 166a is used to retain the thermostatic sensor 150a in a close position behind the first portion 152a. Additionally, a fuse 180 is positioned in the low water sensor niche 174 next to the thermostatic sensor 150a for rapidly responding should a low water condition arise thereby providing additional safety and preventing a potential problem.

The fill tube 62 is shown in FIGS. 14, 15 and 18 engaged with a group of fill tube retainers 182. The fill tube retainers 182 engage a lower portion 184 of the fill tube 62 in a notch 186 while an upper end 188 is mated with the entry port 60. The fill tube retainers 182 maintain the lower end 84 a distance above a bottom surface 190 of the tank 52. When a cap member 192 is attached to the top rim 194 of the tank 52 the fill tube 62 mated with the entry port 60 and engaged with the fill tube retainers 182 is securely retained and thus prevented from disengaging or flexing into contact with the heating element 178. As shown in FIGS. 14, 15 and 18, the fill tube 62 extends through the loop of the heating element 178.

The tank 52 is integrally formed as a single piece body of a suitable plastic material having heat resistant characteristics capable of continuously withstanding substantially on the order of up to 205°. An example of such material is ULTEM ® which is an amorphous thermoplastic polyetherimide produced by GE Plastics of Pittsfield, Mass. In particular, ULTEM ® 1010 is a preferred form of the material for this application although other materials may be selected.

Figure 23:
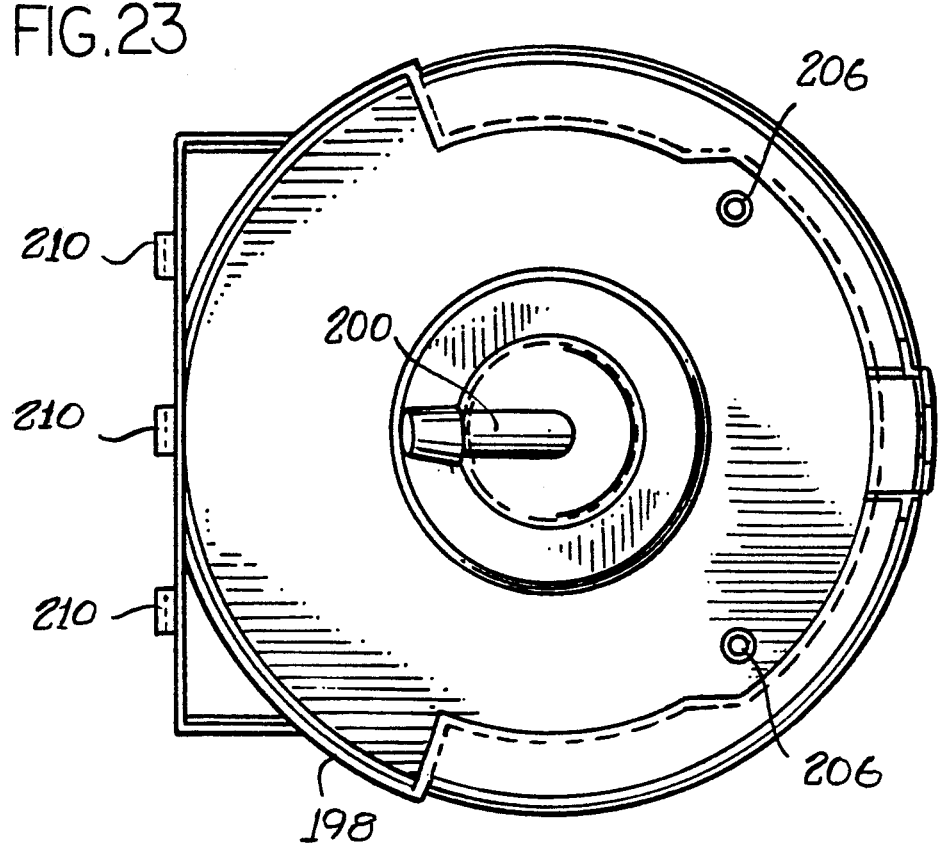
FIG. 23 is a top plan view of the suspension portion.
Figure 22:
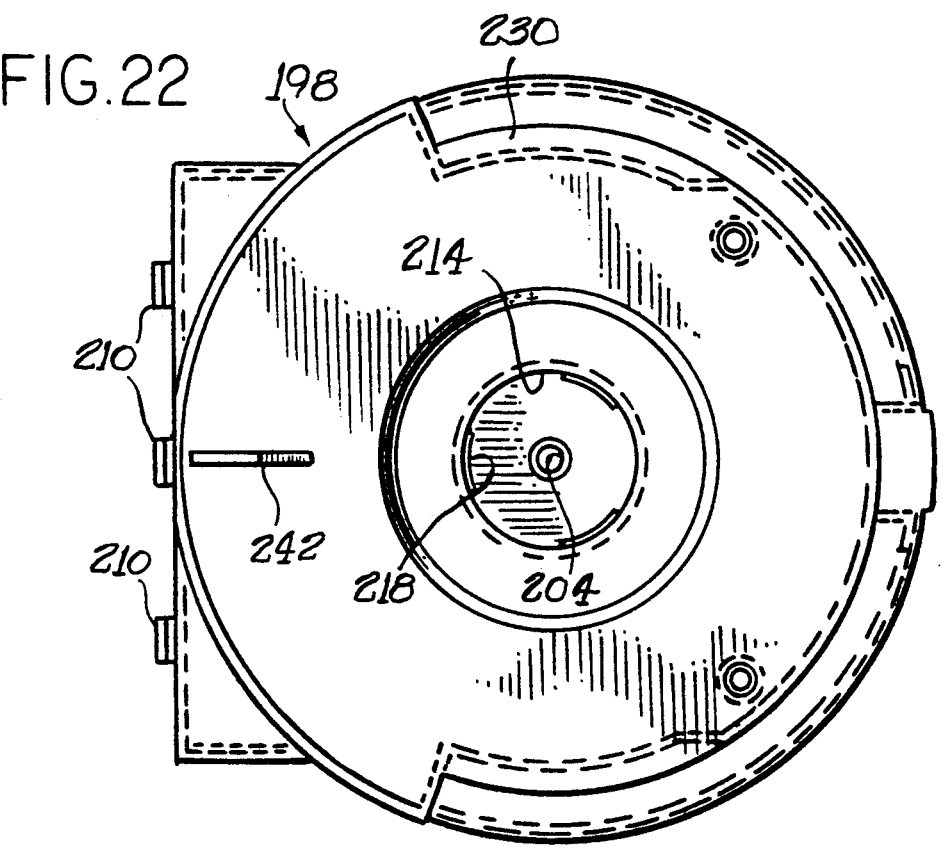
FIG. 22 is a bottom plan view of the suspension portion.

A sprayhead assembly 196 is shown in FIG. 5 and further detailed in FIGS. 9-13, 22 and 23. The spray assembly 196 includes a spray panel 198 which is mounted to the suspension portion 48 having a discharge nozzle 200 attached thereto, and a sprayhead member 202 attachable to said spray panel 198 over a discharge port 204 of said discharge nozzle 200. The sprayhead assembly 196 is positioned in an upper portion of the brewing assembly 46 and delivers water thereto through the discharge nozzle and distributed by the sprayhead member 202. As shown in FIGS. 22 and 23, the sprayhead panel 198 has mounting holes 206 formed therethrough which are alignable with mounting posts 208 formed on the suspension portion 48. Additional mounting support for the spray panel 198 is provided by the mounting tabs 210 which engage an upper edge 212 of the body structure 22. As will be discussed further hereinbelow, the spray panel 198 must be mounted in such a way so as to support the brewing assembly 46 when the basket 28 is filled with a beverage brewing substance as well as brewing water during a brew cycle.

A sprayhead recess 214 is formed in the sprayhead panel 198 to prevent the sprayhead member 202 from interfering with the basket 28 when the basket is mounted thereto. As better shown in the enlarged partial fragmentary cross-sectional views of FIGS. 9 and 10, the sprayhead member 202 mounts inside of the sprayhead recess 214 by way of engagement means 216. The engagement means 216 include partial thread portions 218 which are formed on an outside surface of the sprayhead member 202 and on an inside surface of the sprayhead recess 214. Engagement of the sprayhead member 202 with the sprayhead recess 214 is facilitated by a grip portion 220 which is formed as a raised extended portion extending across the face of the sprayhead member 202.

A foraminous face 222 having a generally partially spherical shape is provided on the sprayhead member and positioned immediately below the discharge port 204 when the sprayhead 202 is mounted to the sprayhead recess 214. Brew water discharged through the discharge nozzle 200 flows through the foraminous face 222 to provide a generally even distribution of water over the beverage brewing substance retained in the basket 28. The construction of the sprayhead 202, which is an integrally formed single piece unitary body, including the grip portion 220, facilitates easy removal from the sprayhead recess 214 to facilitate cleaning. It is important to be able to remove the sprayhead 202 since material may build up in the holes of the foraminous face 222 due to sedimentation particles and coffee oils which are carried in steam which rises from the beverage brewing substance during the brewing process.

FIGS. 21-25 provide details as to the structure and function of the brewing assembly 46 and mounting means 224 for attaching the basket 28 to the suspension portion 48 of the hood assembly 24. The mounting means 224 include a partially circumferential channel 226 attached to the upper edge 228 of the basket 28 and a partially circumferential rim 230 attached to an outwardly facing surface 232 of the spray panel 198. The resulting engagement of the mounting means 224 conceals the mounting means 224 behind a generally continuous surface 234. The partially circumferential channel 226 has an upper lip 236. Leading edges 238 of the upper lip 236 are generally spaced apart on the open end of the partially circumferential channel 226 and have parallel edge portions 240 which help to guide the channel 226 into engagement with the rim 230. The generally parallel portion 240 also help prevent the basket 28 from swivelling when engaged with the rim 230.

A retaining protrusion 242 extends downwardly from a surface of the spray panel 198 generally opposite the mounting means 224. The protrusion 242 engages the inside of a front edge 244 to provide additional retaining force when the basket 28 is engaged with the suspension portion 48. When removing the basket 28, a slight force is applied to a handle 246 of the basket 28 to overcome the retaining force created by the protrusion on the inside front edge 244.

The present invention additionally includes a novel method for assembling the brewer 20 of the present invention as illustrated in FIG. 26. Generally, the brewer 20 is assembled into subassemblies which are then assembled in a continuous process wherein the subassemblies are stacked and secured to one another. With reference to FIGS. 1, 14, and 26, the major subassemblies include the hood portion 24, the reservoir assembly 50, the body structure 22 and a base assembly 248.

Referring to FIGS. 1 and 14, the hood assembly 24 is assembled and placed in an inverted orientation on an assembly line. Wires 250 extending from the first switch 34 in the hood assembly 24 are threaded through the hood assembly 24 prior to engagement of the reservoir assembly 50 thereto. In the next assembly step, the reservoir assembly 50 is inverted and engaged with the hood assembly 24. A hollow tower portion 252 of the body structure 22 is assembled over the inverted reservoir assembly 50 and engaged with the hood assembly 24. The wires 250 from the first switch 34 are threaded through the hollow tower portion 252 prior to the engagement with the hood portion 24. Wires 251, 251a, 253 leading from the thermostatic sensors 150, 150a and the heating element 178, respectively, are also threaded through the hollow tower portion 252. Similarly, wires 255 from the second switch 36 are threaded through the tower portion 252.

As best shown in FIG. 5, an engaging edge 254 of the body structure 22 engages a lip 256 of the reservoir assembly 50. The edge 254 and lip 256 structurally support the reservoir assembly 50 inside of the body structure 22 when the brewing apparatus, as finally assembled, is re-inverted. Screw holes 258 are formed through a ledge 260 of the body structure 2 for receiving fasteners 262 therethrough. The fasteners 262 engage mounting posts 264 which are formed on a cooperative surface of the hood portion 24. In the inverted orientation, the fasteners 262 are driven into the mounting posts 264 to securely engage the hood portion 24, reservoir assembly 50, and body structure 22.

The final step of the assembly process includes attaching the wires 250, 251, 251a, 253, 255 to appropriate connections in the base assembly 248. The base assembly 248 is inverted and the warming plate 32 is positioned inside the opening formed in the base structure 26. Once the base assembly 248 is properly positioned fasteners 266 are driven through holes in the base assembly and into mounting posts which are cooperatively formed and positioned on the inside of the body structure 22 (mounting posts not shown).

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A beverage brewing apparatus including a reservoir controllably communicating with a fill basin and a brewing assembly, a fill port for passing water from said fill basin to said reservoir and a drain port for passing water from said reservoir to said brewing assembly, an opening in said fill basin for receiving fill water therethrough; a fill water control assembly for controllably regulating the flow of water from said fill basin to said reservoir, said fill water control assembly including a lid assembly displaceably covering said opening and a valve displaceably engaging said fill port, said lid assembly and valve being operatively associated for controlling water flow into and out of said fill basin, said lid assembly moving said valve to engage said fill port when said lid assembly is displaced from said opening and said lid assembly operatively displacing said valve from said fill port when said lid assembly is positioned to cover said opening.

2. A beverage brewing apparatus according to claim 1 wherein said lid assembly includes a lid member and a shaft, said lid member being sized and dimensioned for covering said opening, said shaft extending from said lid member and operatively engaging said valve for controllably displacing said valve.

3. A beverage brewing apparatus according to claim 2 wherein one of said fill and drain ports in communication with said reservoir is controllably releasably sealed by said valve; said valve including an arm member and a stopper attached to a first end thereof, said stopper sealing one of said fill and drain ports, a second end of said arm operatively engaging said shaft, movement of said lid member moving said shaft and said second end of said arm engaged therewith for sealing and unsealing one of said fill and drain ports.

4. A beverage brewing apparatus according to claim 3 wherein a base structure in said fill basin supports said arm intermediate said first end and said second end and provides a pivot point for said arm, said shaft operatively rotating said arm about said pivot point of said base structure for sealing and unsealing said stopper from one of said fill and drain ports.

5. A beverage brewing apparatus according to claim 1 wherein said valve is positioned in said fill basin for controllably sealing said fill port.

6. A beverage brewing apparatus including a reservoir controllably communicating with a fill basin and a brewing assembly, a fill port for passing water from said fill basin to said reservoir, an opening in said fill basin for receiving fill water therethrough; a fill water control assembly controllably regulating the flow of water from said fill basin into said reservoir, said fill water control assembly including a lid assembly displaceably covering said opening and a valve displaceably engaging said fill port, said lid assembly and valve being operatively associated for controlling water flow into and out of said fill basin, said lid assembly moving said valve to engage said fill port when said lid assembly is displaced from said opening and said lid assembly operatively displacing said valve from said fill port when said lid assembly is positioned for covering said opening, said fill port being controllably releasably sealed by said valve; said lid assembly including a lid member for displacably covering said opening and a depending shaft extending from said lid member into said fill basin; said valve being disposed inside of said fill basin and including an arm member having a first end and a second end and a stopper attached to said first end thereof, said stopper sealing said fill port, said second end of said arm operatively engaging said shaft, movement of said lid member moving said shaft and said second end of said arm engaged therewith for sealing and unsealing said fill port.

7. In combination with a beverage brewing apparatus a moisture recovery assembly for reducing moisture loss from said beverage brewing apparatus, said beverage brewing apparatus comprising: a hood assembly including a fill basin having a bottom sloped towards a fill port; a reservoir having an entry port in communication with said fill port for receiving water disposed in said fill basin; a cover extending over said fill basin, a hollow sleeve attached to and extending through said cover into said fill basin downwardly towards said bottom for receiving water therethrough, a top end of said sleeve providing an opening in said cover and a lower end of said sleeve directed towards said bottom, an outside surface of said sleeve collecting condensation from said fill basin and draining the condensation into the fill basin, and said sleeve minimizing the exposed surface area of water in said fill basin for minimizing evaporation of water retained in said fill basin.

8. A moisture recovery assembly according to claim 7 wherein said sleeve extends downwardly into said fill basin, said lower end of said sleeve spaced in close proximity to said bottom of said fill basin.

9. A moisture recovery assembly according to claim 7 further including a grill structure over said sleeve for providing condensation recovery and structural reinforcement, said grill structure having a partially spherical shape curving from a center of said sleeve towards an inside wall of said sleeve for directing condensation accumulated thereon towards said walls for drainage into said fill basin.

10. A moisture recovery assembly according to claim 7 further including a plurality of vents formed through said cover, a baffle opening formed in said vents for limiting air flow therethrough, a collecting portion of said vents directed downwardly towards said fill basin for collecting and returning condensation to said fill basin.

11. A moisture recovery assembly according to claim 10 wherein said baffle opening extends through a side portion of said vents for limiting ventilation of said fill basin and reducing updrafting of moisture through said vents.

12. A brewing assembly for use with a beverage brewing apparatus; said beverage brewing apparatus including a suspension portion beneath which said brewing assembly is positioned, said brewing assembly being positioned beneath a discharge port and retaining a quantity of a beverage brewing substance therein for infusion by water disposed therein from said discharge port; said brewing assembly comprising a basket having a top opening and a bottom drain and mounting means for releasably attaching said brewing assembly to said suspension portion, said mounting means including a partially circumferential rim on an outwardly facing surface of said suspension portion and a partially circumferential channel on a corresponding top surface of said basket, said partially circumferential rim being cooperatively engageable with said partially circumferential channel for attaching said basket to said suspension portion of said beverage brewing apparatus.

13. A brewing assembly according to claim 12 further including a retaining protrusion on one of said suspension portion and said basket, said protrusion releasably engaging the other of said suspension portion and said basket for preventing unintended disengagement of said basket from said suspension portion.

14. A beverage brewing apparatus with a water heating assembly including a reservoir for retaining water during heating and a heating element, said reservoir having side walls and a bottom, said reservoir controllably communicating with a fill basin and a brewing assembly, a fill port for passing water from said fill basin to said reservoir and a drain port for passing water from said reservoir to said brewing assembly, an opening in said fill basin for receiving fill water therethrough, said beverage brewing apparatus comprising:
a fill water control assembly for controllably regulating the flow of water from said fill basin to said reservoir, said fill water control assembly including a lid assembly displaceably covering said opening and a valve displaceably engaging said fill port, said lid assembly and valve being operatively associated for controlling water flow into and out of said fill basin, said lid assembly moving said valve to engage said fill port when said lid assembly is displaced from said opening and said lid assembly operatively displacing said valve from said fill port when said lid assembly is positioned to cover said opening; and
an improved thermostat configuration and low water sensing configuration for use with said water heating assembly;
said thermostat configuration comprising a first portion of said side wall having a thickness which is less than the surrounding area of said side wall and a thermostatic sensor retained outside of said reservoir in close proximity to said first portion such that said thermostatic sensor senses the temperature of water in said reservoir from the outside of the reservoir through said reservoir side wall;
said low water sensing configuration comprising a first portion having a thickness which is less than the surrounding area of said bottom and a thermostatic sensor retained outside of said reservoir in close proximity to said first portion such that said thermostatic sensor senses the temperature in said reservoir from the outside of said reservoir through said first portion when the water level in said reservoir drops below a predetermined level.

15. A beverage brewing apparatus with a hood assembly including a fill basin having a bottom sloped towards a fill port, a reservoir controllably communicating with a brewing assembly and said fill basin, said fill port passing water from said fill basin to said reservoir, an opening in said fill basin for receiving fill water therethrough, said beverage brewing apparatus comprising:
a fill water control assembly controllably regulating the flow of water from said fill basin into said reservoir, said fill water control assembly including a lid assembly displaceably covering said opening and a valve displaceably engaging said fill port;
said lid assembly and valve being operatively associated for controlling water flow into and out of said fill basin, said lid assembly moving said valve to engage said fill port when said lid assembly is displaced from said opening and said lid assembly operatively displacing said valve from said fill port when said lid assembly is positioned for covering said opening, said fill port being controllably releasably sealed by said valve;
said valve being disposed inside of said fill basin and including an arm member having a first end and a second end and a stopper attached to said first end thereof, said stopper sealing said fill port, said second end of said arm operatively engaging said shaft, movement of said lid member moves said shaft and said second end of said arm engaged therewith for sealing and unsealing said fill port;
a moisture recovery assembly for reducing moisture loss from said beverage brewing apparatus, a cover extending over said fill basin, a hollow sleeve attached to and extending through said cover into said fill basin downwardly towards said bottom for receiving water therethrough, a top end of said sleeve communicating with said opening in said fill basin and a lower end of said sleeve directed towards said bottom, an outside surface of said sleeve collecting condensation from said fill basin and draining the condensation into the fill basin, and said sleeve minimizing the exposed surface area of water in said fill basin for minimizing evaporation of water retained in said fill basin;
a plurality of vents formed through said cover, a baffle opening formed in said vents for limiting air flow therethrough, a collecting portion of said vents directed downwardly towards said fill basin for collecting and returning condensation to said fill basin;
a brewing assembly for use with said beverage brewing apparatus, said beverage brewing apparatus including a suspension portion beneath which said brewing assembly is positioned, said brewing assembly being positioned beneath a discharge nozzle and retaining a quantity of a beverage brewing substance therein for infusion by water disposed therein from said discharge nozzle, said brewing assembly comprising a basket having a top opening and a bottom drain and mounting means for releasably attaching said brewing assembly to said suspension portion, said mounting means including a partially circumferential rim on an outwardly facing surface of said suspension portion and a partially circumferential channel on a corresponding top surface of said basket, said partially circumferential rim being cooperatively engageable with said partially circumferential channel for attaching said basket to said suspension portion of said beverage brewing apparatus; and a sprayhead assembly for use with said beverage brewing apparatus, said brewing assembly being positioned beneath said spray assembly, a sprayhead member attaching over an end of said discharge nozzle for distributing water delivered by said discharge nozzle over said beverage brewing substance, said sprayhead member comprising a generally circular rim portion having a foraminous face formed inside of said rim portion for dispersing water discharge from said discharge nozzle, and cooperatively engagable engagement means on said sprayhead and said spray assembly for retaining said sprayhead over said discharge nozzle.

16. A beverage brewing apparatus with a water heating assembly including a reservoir for retaining water during heating and a heating element, said reservoir having side walls and a bottom, a hood assembly including a fill basin having a bottom sloped towards a fill port, said reservoir controllably communicating with a brewing assembly and said fill basin, said fill port passing water from said fill basin to said reservoir and a drain port for passing water from said reservoir to said brewing assembly, an opening in said fill basin for receiving fill water therethrough, said beverage brewing apparatus comprising:

an improved thermostat configuration and low water sensing configuration for use with said water heating assembly;

said thermostat configuration comprising a first portion of said side wall having a thickness which is less than the surrounding area of said side wall and a thermostatic sensor retained outside of said reservoir in close proximity to said first portion such that said thermostatic sensor senses the temperature of water in said reservoir from the outside of the reservoir through said reservoir side wall;

said low water sensing configuration comprising a first portion having a thickness which is less than the surrounding area of said bottom and a thermostatic sensor retained outside of said reservoir in close proximity to said first portion such that said thermostatic sensor senses the temperature in said reservoir from the outside of said reservoir through said first portion when the water level in said reservoir drops below a predetermined level;

a fill water control assembly controllably regulating the flow of water from said fill basin into said reservoir, said fill water control assembly including a lid assembly displaceably covering said opening and a valve displaceably engaging said fill port;

said lid assembly and valve being operatively associated for controlling water flow into and out of said fill basin, said lid assembly moving said valve to engage said fill port when said lid assembly is displaced from said opening and said lid assembly operatively displacing said valve from said fill port when said lid assembly is positioned for covering said opening, said fill port being controllably releasably sealed by said valve;

said valve being disposed inside of said fill basin and including an arm member having a first end and a second end and a stopper attached to said first end thereof, said stopper sealing said fill port, said second end of said arm operatively engaging said shaft, movement of said lid member moves said shaft and said second end of said arm engaged therewith for sealing and unsealing said fill port;

a moisture recovery assembly for reducing moisture loss from said beverage brewing apparatus, a cover extending over said fill basin, a hollow sleeve attached to and extending through said cover into said fill basin downwardly towards said bottom for receiving water therethrough, a top end of said sleeve communicating with said opening in said fill basin and a lower end of said sleeve directed towards said bottom, an outside surface of said sleeve collecting condensation from said fill basin and draining the condensation into the fill basin, and said sleeve minimizing the exposed surface area of water in said fill basin for minimizing evaporation of water retained in said fill basin;

a plurality of vents formed through said cover, a baffle opening formed in said vents for limiting air flow therethrough, a collecting portion of said vents directed downwardly towards said fill basin for collecting and returning condensation to said fill basin;

a brewing assembly for use with said beverage brewing apparatus, said beverage brewing apparatus including a suspension portion beneath which said brewing assembly is positioned, said brewing assembly being positioned beneath a discharge nozzle and retaining a quantity of a beverage brewing substance therein for infusion by water disposed therein from said discharge nozzle, said brewing assembly comprising a basket having a top opening and a bottom drain and mounting means for releasably attaching said brewing assembly to said suspension portion, said mounting means including a partially circumferential rim on an outwardly facing surface of said suspension portion and a partially circumferential channel on a corresponding top surface of said basket, said partially circumferential rim being cooperatively engageable with said partially circumferential channel for attaching said basket to said suspension portion of said beverage brewing apparatus; and a sprayhead assembly for use with said beverage brewing apparatus, said brewing assembly being positioned beneath said spray assembly, a sprayhead member attaching over an end of said discharge nozzle for distributing water delivered by said discharge nozzle over said beverage brewing substance, said sprayhead member comprising a generally circular rim portion having a foraminous face formed inside of said rim portion for dispersing water discharged from said discharge nozzle, and cooperatively engagable engagement means on said sprayhead and said spray assembly for retaining said sprayhead over said discharge nozzle.

* * * * *